United States Patent [19]

Minemura et al.

[11] Patent Number: 4,978,187

[45] Date of Patent: Dec. 18, 1990

[54] OPTICAL ELEMENT, OPTICAL DISC AND ROTARY ENCODER WITH THE OPTICAL ELEMENT

[75] Inventors: Hiroyuki Minemura; Yoshio Sato, both of Hitachi; Nobuyoshi Tsuboi, Ibaraki; Hiroaki Koyanagi, Katsuta; Shinji Ohyama, Hitachi, all of Japan

[73] Assignee: Hitachi, Ltd., Tokyo, Japan

[21] Appl. No.: 357,171

[22] Filed: May 26, 1989

[30] Foreign Application Priority Data

May 27, 1988 [JP] Japan .................................. 63-129935

[51] Int. Cl.⁵ .......................... G02B 6/12; G02B 6/10; G11B 3/90; G11B 5/09
[52] U.S. Cl. .................................. 350/96.11; 369/53; 350/96.13; 350/96.19
[58] Field of Search ............... 350/96.11, 96.13, 96.14, 350/96.15, 96.19; 369/53, 18

[56] References Cited

U.S. PATENT DOCUMENTS

| | | | |
|---|---|---|---|
| 4,184,114 | 1/1980 | Minakuchi | 324/79 D |
| 4,718,052 | 1/1988 | Kondo et al. | 350/96.18 |
| 4,733,065 | 3/1988 | Hoshi et al. | 369/45 |
| 4,763,972 | 8/1988 | Papuchon et al. | 350/96.13 |
| 4,779,259 | 10/1988 | Kono et al. | 350/96.18 |

FOREIGN PATENT DOCUMENTS 0296540  12/1986  Japan .

OTHER PUBLICATIONS

"Dielectric surface–relief gratings with diffraction efficiency" by Applied Optics, 15 Jul. 1984/vol. 23, No. 14 pp. 2303–2310.
"Polarization effects in silicon–clad optical waveguides" by Carson et al., Applied Optics, 1 Sep. 1984/vol. 23, No. 17, pp. 2987–2989.
"Integrated optical circuit" published by Ohm publishing Co. Ltd. pp. 19–24.

*Primary Examiner*—Akm Ullah
*Attorney, Agent, or Firm*—Antonelli, Terry, Stout & Kraus

[57] ABSTRACT

A waveguide path type optical pickup is provided for preventing a returning light from returning back to a light source. A filter for selectively allowing either Te polarized light or TM polarized light to pass through the filter is provided in an optical path from a light source to an optical path deflector. An optical part for changing the polarized state of light is provided in an optical path from the optical path changing part to an information recording medium, thereby prevent a reduction in S/N ratio or reproducing signal.

22 Claims, 10 Drawing Sheets

OPTICAL ELEMENT, OPTICAL DISC AND ROTARY ENCODER WITH THE OPTICAL ELEMENT

BACKGROUND OF THE INVENTION

1. Field of the Invention

The present invention relates to an optical element for recording, erasing and reproducing informations to an information recording medium such as an optical disc, and to an apparatus with the optical element.

2. Description of the Prior Art

An example of a conventional optical element, more specifically a conventional waveguide type pickup used in an optical disc is shown in FIG. 20. This example is shown in Japanese Patent Unexamined Publication No. 61-296540. In FIG. 20, there are shown a semiconductor laser 10, a substrate 20, a waveguide layer 40, a dielectric layer 30 between the substrate 20 and the waveguide layer 40, a disc 50, signal pits 52, a laser beam 60, optical detectors 70, a beam splitter 80, a light focusing or converging grating coupler 90 used as an optical path changing means.

The waveguide type optical pickup is produced as follows. The dielectric layer 30 is formed on the substrate 20 by means of oxidation, vapor deposition or the like. Further, the waveguide layer 40 is formed by vapor deposition or sputtering. The beam splitter 80 the light converging grating coupler 90 and the like are formed on the other dielectric layer formed on the waveguide layer 40 by a photolithographic process, an electronic beam exposure process or a plasma etching process.

The operation of the conventional waveguide type optical pickup thus structured will now be explained. The laser beam 60 emitted from the semiconductor laser 10 is propagated through the waveguide layer 40 into the beam splitter 80. A zero-order beam that has not been diffracted is focused or converged onto the signal pit 52 on the disc 50 by the light converging grating coupler 90. A reflective beam from the disc 50 is again introduced into the waveguide layer 40 by the light converging grating coupler 90 to become a returning waveguided light advancing in a direction opposite to the emission beam and is introduced into the beam splitter 80 which is composed of two light-focusing or converging gratings to divide the returning waveguided beam into two halves to be introduced into the optical detectors 70. The detectors 70 are positioned on both sides of the light source 10. One each side, the detector 70 is divided into two parts and is used for picking up the focus error signal produced when the laser beam 60 is projected from the semiconductor laser 10 to the disc 50 and the tracking error signal and for reproducing the recording information of the signal pit 52. FIG. 20 shows a case where the tracking error is detected by a Foucault method or a push-pull method. The detailed explanation therefor is omitted because these methods are known and not essential for explanation of the present invention.

An access time of an information recording medium such as an optical disc that is a large capacity memory means is generally determined by how fast the optical pickup can be moved by a linear motor. The speed of the pickup depends upon the weight of the pickup. For this reason, in order to reduce the access time lag, there have been attempts to make the pickup light in weight and small in size. Thus, the studies and development of an integrated waveguide type optical pickup have been continued.

On the other hand, in an optical pickup, when a reflective light from a disc surface is returned back to the light source, the disc surface serves as an external resonator to make the oscillating condition of the light source unstable, resulting in reduction of a S/N (Signal-to-Noise) ratio of the reproduced signal. For this reason, in a generally used bulk type optical pickup, the returning light to the light source is avoided by, for example, combination of a ¼ wavelength plate and a polarizing beam splitter.

However, any waveguide type optical pickup that has been proposed suffers from a serious problem. Namely, the primary or first order diffracted light of the beam splitter 80 in the returning waveguide light can be converged into the optical detector 70, but the zero order diffracted light is returned back to the semiconductor laser 10. Thus, the conventional waveguide type optical pickup suffers from such a problem that S/N ratio of the reproduced signal is lowered.

SUMMARY OF THE INVENTION

In view of the foregoing defects inherent in the prior art, an object of the present invention is to provide a waveguide type optical element such as an optical pickup for an optical disc, which may prevent returning light from returning back to the light source, thereby preventing the reduction in S/N ratio of the reproducing signal.

In order to achieve this and other objects, according to the present invention, there is provided an optical element comprising: an optical waveguide for propagating an emission light from a light source; an optical path changing means for leading the emission light from the optical waveguide to an external space, converging the thus led emission light onto an information recording medium, and introducing a reflective light from the information recording medium into the optical waveguide; a beam splitter means for branching the reflective light, introduced by the optical path changing means, away from the optical path of the emission light and for directing the branched light into light detecting means; a filter means for allowing one of TE polarized light (transversal electric wave, or an S-polarized light) and TM polarized light (transversal magnetic wave, or P-polarized wave) to pass therethrough, said filter means being located in an optical path from the light source to the optical path changing means; and a polarization switching means for changing a polarized state of the light by allowing the light to reciprocatingly pass there through, the polarization switching means being situated in an optical path between the optical path changing means and said information recording medium. It is preferable that the optical waveguide be a thin film optical waveguide.

It is preferable that the filter be a metal clad optical waveguide made of conductive material having a characteristic that w en an electric field is applied, a current flows through the material, i.e., a metal layer.

The polarization switching means has refractive indexes different for the TM polarization and the TE polarization. The switching means may be formed of a ¼ wavelength plate using an anisotropic crystal or a ¼ wavelength plate composed of a surface relief type hologram.

The optical path switching means is preferably formed of a light-convergent or focusing grating coupler.

Preferably, the light source includes a semiconductor laser. The emission light of the semiconductor laser has a large proportion of the TE polarization component. The structure in which metal layers are arranged in parallel to the oscillation direction of the electric field of the emission light is used as a TE pass filter for preventing the TM polarized light, from passing therethrough.

The structure in which meal layers are arranged perpendicularly to the oscillation direction of the electric field of the emission light is used as a TM pass filter for preventing the TE polarized light from passing through.

It is preferable that an intermediate layer having a smaller refractive index than that of the waveguide be interposed between the filter of the above-mentioned metal layer and the waveguide.

A polarizing beam splitter made of a surface relief type hologram is provided in an optical path from the light source toward the optical path changing means, and a TE pass filter for preventing the transmission of the TM polarized light may be provided in an optical path between the light source and the polarizing beam splitter at a Bragg angle with respect to the polarizing beam splitter. In this case, in particular, the light source may be formed of a semiconductive laser for emitting TE polarized light to thereby dispense with the filter itself.

Alternatively, a polarizing beam splitter composed of a surface relief hologram may be provided in an optical path from the light source to the optical path changing means, and a TM pass filter for preventing the transmission of the TE polarized light may provided as the filter between the light source and the polarizing beam splitter. In this case, it is preferable to orient the polarizing beam splitter so that the reflective light having passed through the optical path changing means to be the TE polarized light is introduced at an incident angle of Bragg angle so that light from the light source can be utilized at highest efficiency.

Utilizing the phenomenon that the light absorbing characteristic is reversed due to a difference or change in film thickness of the semiconductor layer, it is possible to provide a semiconductor layer for selectively allowing one of the TE polarized light and TM polarized light to pass therethrough, the semiconductor being located in an optical path from the information recording medium toward the optical detectors.

At least one of the light grating coupler, the beam splitter and the ¼ wavelength plate may be formed in the same plane as the intermediate layer between the conductive layer such as a metal layer and the optical waveguide.

A wavelength selective means including a first optical waveguide into which the light wave is introduced from the light source, a second optical waveguide independent of the first optical waveguide and a third optical waveguide in the form of an annulus between the first and second optical waveguides may be formed in the optical wave guide. At the same time, a metal layer may be formed over the first, second and third optical waveguides.

It is most preferable that the optical element according to the present invention be used as an optical pickup.

The optical pickup may have the intermediate layer having a variable refractive index.

Also, any type of the above-described optical pickup may be used as a means for optically reading out the information from the information recording medium in various apparatuses such as an optical disc drive and a rotary encoder.

According to the present invention, for example, the TM polarized component of the emission light from the light source is prevented while the TE polarized component thereof is allowed to pass through the filter. The beam is led to the external space by the optical path changing means and is converged on the information recording medium by the polarization switching means. The reflective light is again introduced into the optical waveguide through the polarization switching means and the optical path changing means. In this case, the TE polarized light is converted into the TM polarized light by the polarization switching means and is branched from the emission light by the beam splitter, to be introduced into the optical detectors where the information is read out. In this case, since the noise in the light beam advancing toward the light source through the beam splitter, the noise is cut by the filter but does not enter the light source. Namely, the returning light is prevented from returning back to the light source.

The metal layers used as the filter provided in parallel to the optical waveguide path, serves as the TE mode pass filter or the TM mode pass filter.

If the emission light is the TE polarized light in a case where the ¼ wavelength plate as the polarization switching means is used, the reflective light from the information recording medium is the TM polarized light. Thus, the filter performs the function. In this case, if the ¼ wavelength plate is composed of a surface relief type hologram, it is possible to reduce the number of the optical parts to make the element light in weight.

If the intermediate layer is provided, it is possible to prevent the degradation in performance due to the direct provision of the filter such as a metal layers.

When the polarized beam splitter is used, it is possible to displace a relative position between the light source and the optical detectors and to more effectively prevent the noise in the light beam from returning back to the light source. In this case, if the semiconductor laser for emitting the TE polarized light is used as the light source, it is possible to dispense with the filter.

Since the semiconductor layer may be changed to serve as either TM mode pass filter or TE mode pass filter when the thickness thereof is changed, it is possible to positively prevent the noise light from entering into the optical detectors by changing the thickness.

It is possible to compensate the variation in oscillation wavelength of the light source such as a semiconductor laser by means of the wavelength selective means.

If the refractive index of the intermediate layer is variable, the extinction ratio and the power of the light given to the disc or the like can be made variable.

According to the invention, it is possible to prevent the returning light from returning back to the light source by the combination of the filter for allowing either TE polarized light or TM polarized light to pass therethrough and the polarization switching means. thus, it is possible to provide an optical pickup of waveguide type that may prevent the degradation in S/N ratio of the reproduction signal.

If the polarization switching means is the ¼ wavelength plate made of a surface relief type hologram, it is possible to reduce the number of the optical parts and to make the entire device light in weight.

Since the filter is not directly fixed to the optical waveguide due to the provision of the intermediate layer, there is no fear that the characteristics of the waveguide would be degraded in the manufacturing process.

If the polarized beam splitter is made of a surface relief type hologram, it is possible to design the element with enhanced the diffraction efficiency of the beam splitter. In this case, the efficiency of utilization of the light is enhanced. Also, it is possible to further prevent the returning light from returning back to the light source.

If the filter made of semiconductor layer(s) is provided before the optical detector, it is possible to prevent the introduction of the noise light.

If the wavelength selective means is provided in the optical waveguide, it is possible to obviate the problem such as generation of aberration concomitant with the variation in wavelength of oscillation of the light source.

DETAILED DESCRIPTION OF THE PREFERRED EMBODIMENTS

A principle on which the present invention is based will now be described with reference to FIGS. 3 to 5.

Figure 3:
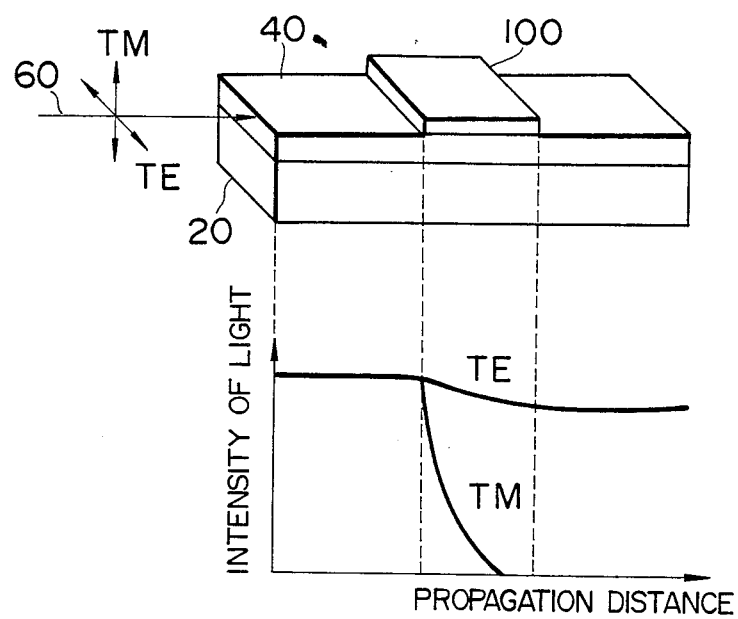
FIG. 3 is a perspective view showing an optical waveguide with a metal layer being formed on a surface of the waveguide.

FIG. 3 shows an optical waveguide with a metal layer being loaded or deposited on a surface of the waveguide. In FIG. 3, there are shown a substrate 20, a waveguide layer 40, a laser beam 60 and a metal layer 100.

In general, if a high refractive medium (waveguide layer) is coated with a low refractive medium (clad layer), the light wave may propagate through the waveguide layer when an incident angle of the light wave is limited within a small angle. In the waveguide shown in FIG. 3 the waveguide layer is interposed between the substrate and an air layer. In this case, the guided or trapped mode for the light wave is characterized in that not only an electromagnetic field is not total-reflected at an interface between the waveguide layer and the clad layer, but the electromagnetic field has a field component called an evanescent field which penetrates into the clad layer and optical wave is shifted a due to Goos-Hänchen shift upon the reflection. The evanescent field has substantially the same depth or width as that of a wavelength of light to be guided. Namely, the optical waveguide is in the form of a thin film. In the waveguide shown in FIG. 3, the substrate and the air layer form clad layers. Also, a metal layer outside the waveguide layer instead of a transparent dielectric clad layer (aerial layer) may be provided, which is referred to as a metal cladding.

In the wavelength region of light, it is possible to regard the metal as a dielectric substance having a negative dielectric constant and a large loss. Accordingly, in the above-described waveguide to which the metal cladding is applied, the evanescent field invades or penetrates into an interior of the metal layer, and the guided light is subjected to a propagation loss due to the interaction between the evanescent field and the metal layer. This characteristic is changed in accordance with the polarized condition of the guide light, i.e., the difference in oscillation direction of the electric field of the light wave. In case of a TM polarization, since the electric field is oscillated in the vertical direction to the metal layer, the electric field distribution of the evanescent field is substantial at positions deep in the metal layer. As a result, the guided light wave is subjected to the effect of the metal layer, thus increasing the loss. However, in case of a TE polarization, since the electric field is oscillated in parallel with the metal layer, the loss is low. By utilizing this phenomenon, it is possible to provide a TE mode pass filter. In order to effectively use the interaction between the evanescent field and the metal layer, it is preferable that the thickness of the waveguide layer be substantially the same as a depth or extent of the evanescent field.

The theoretical treatment of the pass filter is described in various publications such as "Optical Integrated Circuit" written by Hiroshi Nishihara. Only the results are explained herein. For instance, assuming that the wavelength $\lambda$ be 1.3 $\mu$m, the metal be aluminum ($\epsilon m = -114 - j37$), the substrate be a slide glass (ns=1.502), the thickness of the waveguide T is 8 $\mu$m, and a suitable waveguide layer be provided, the propagation loss is calculated as follows. The propagation loss in the TEo mode is 0.6 dB/cm, whereas the propagation loss in the TMo mode is as high as 36dB/cm. If the length of the metal layer is 2cm, extinction ratio is obtained above 70dB.

Figure 4:
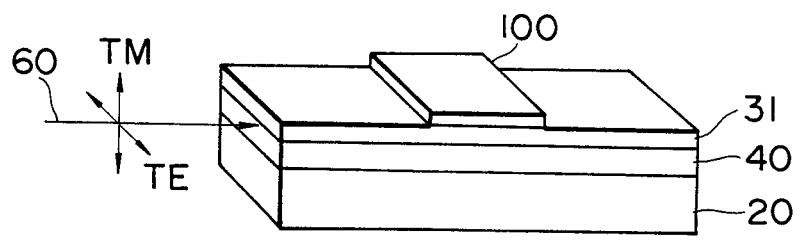
FIG. 4 is a perspective view showing an optical waveguide in which a dielectric intermediate layer having a low refractive index is interposed between the metal layer and the waveguide layer.

FIG. 4 shows an optical waveguide in which a dielectric intermediate layer having a low refractive index is interposed between a metal layer and a waveguide layer for protecting an insulating the waveguide layer. In FIG. 4, there are shown a substrate 20, the intermediate layer 31, the waveguide layer 40, a laser beam 60, and the metal layer 100. The intermediate layer serves to moderate the effect of the metal layer on the guided beam. In the same manner as in FIG. 3, the effect of the intermediate layer is remarkable in the TM mode. Therefore, it is possible to realize a TE mode pass filter even by adding the intermediate layer. In general, even if the intermediate layer is interposed, the propagation loss in the TM mode by the metal layer is higher than that in the TE mode by ten times or more. In the foregoing embodiment, the intermediate layer is formed over the entire surface of the waveguide layer. However, it is not always necessary to provide the intermediate layer over the entire surface of the waveguide layer but it would be sufficient to provide the intermediate layer only between the metal layer and the waveguide layer.

Figure 5:
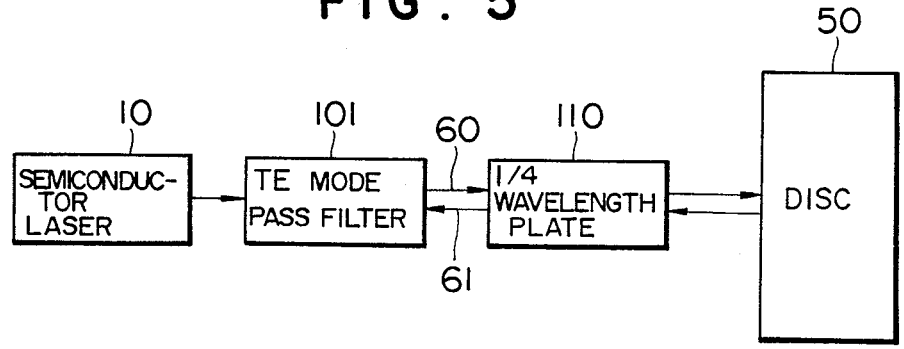
FIG. 5 is a block diagram of a returning light preventing means composed, in combination, of a waveguide type TE mode pass filter and a ¼ wavelength plate.

FIG. 5 shows a basic structure of a returning light preventing means composed, in combination, of a TE mode pass filter of the above-described waveguide type and a ¼ wavelength plate. In FIG. 5, there are shown a semiconductor laser 10, a disc 50, a laser beam 60, a reflective light 61, the waveguide type TE mode pass filter 101 and the ¼ wavelength plate 110. The laser beam 60 emitted in a state of the TE polarization from the semiconductor laser 10 is passed through the waveguide type TE mode pass filter 101, is converted into a circularly polarized light by the ¼ wavelength plate 110 and is introduced into the disc 50. When the reflective light 61 from the disc 50 again passes through the ¼ wavelength plate 110, the reflective light is absorbed by the waveguide type TE mode pass filter 101 because of the conversion into the TM polarized light by the ¼ wavelength plate 110. Thus, the returning light is not returned back to the semiconductor laser 10. With such a basic structure, it is possible to realize the waveguide type optical pickup having the returning light preventing means.

Embodiments of the present invention will now be described with reference to the accompanying drawings.

Figure 1:
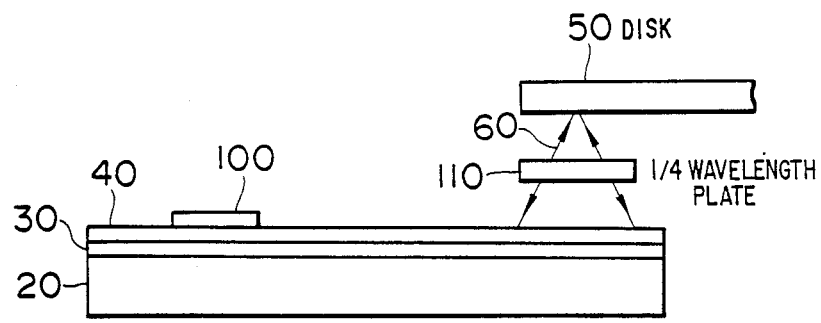
FIGS. 1 and 2 are a side elevational view and a plan view showing a general structure of an optical system in accordance with an embodiment of the invention.
Figure 2:
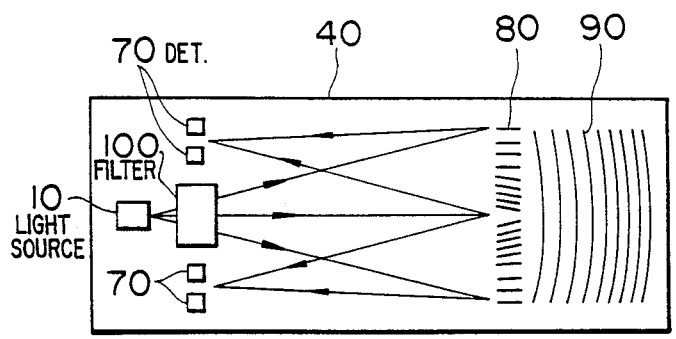

FIGS. 1 and 2 are a side elevational view and a plan view showing a general structure of an optical system in accordance with one embodiment of the invention. In FIGS. 1 and 2, there are shown a light source 10 composed of a semiconductor laser, a substrate 20, a dielectric layer 30, a waveguide layer 40 forming an optical waveguide, a disc 50, a laser beam 60, optical detectors 70, a beam splitter 80, an optical path changing element 90 composed of a light convergent or focusing grating coupler, a filter 100 made of metal and a ¼ wavelength plate 110 of an anisotropic crystal.

In the embodiment, the metal layer 100 is provided at a position between the semiconductor laser 10 and the beam splitter 80 on a surface of the waveguide layer 40, to form a TE mode pass filter explained in conjunction with FIG. 3. The ¼ wavelength plate 110 is disposed between the light convergent grating coupler 90 and the disc 50 to form a returning light preventing optical system shown in FIG. 5. If the light emitted from the semiconductor laser 10 is the TE polarized light, it is possible to provide a waveguide type optical pickup having the returning light preventing means. The intermediate layer (buffer layer) may be interposed between the metal layer and the waveguide layer as shown in FIG. 4. In this case, if the refractive index can be changed by using a non-linear optical material such as liquid crystal or $LiNbO_3$ as the intermediate layer, the extinction ratio and the irradiation power to the disc can be changed as desired.

Figure 20:
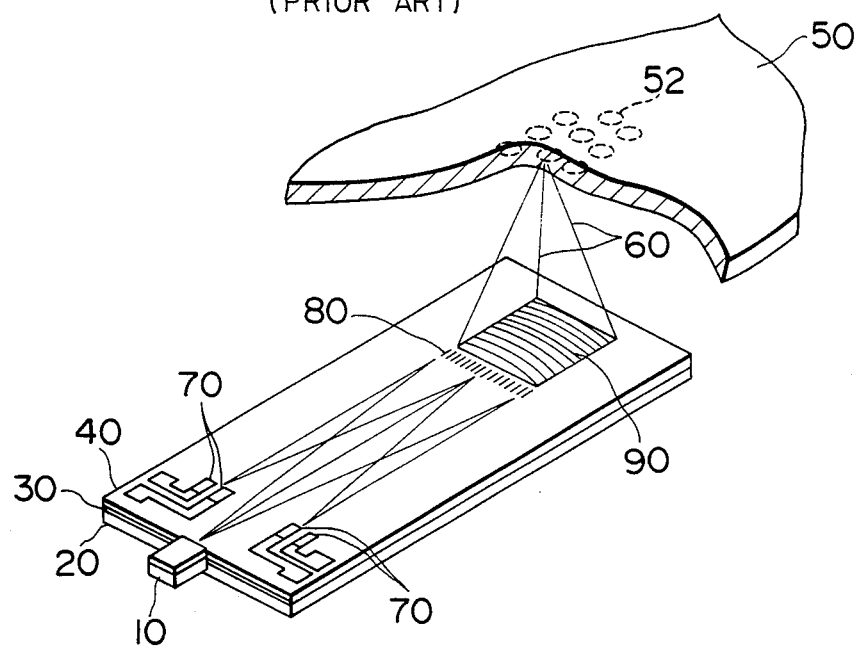
FIG. 20 is a schematic view showing an optical system of the conventional waveguide type optical pickup.

Incidentally, in the conventional example shown in FIG. 20, since the semiconductor laser 10 was mounted outside of the waveguide path, the incident efficiency to the waveguide layer 40 was low, and it was difficult to adjust the mounting position thereof suitably. According to the embodiment of the invention, the semiconductor laser 10 is formed on the substrate and is located within the optical waveguide, thereby enhancing the light utilization efficiency and dispensing with the mounting position adjustment. Generally, that a GaAs laser in a double heterojunction or a quantum well structure is used as the semiconductor laser 10. In order to oscillate the laser within the waveguide layer 40 in a stable manner, DFB (distributed feedback) or DBR (distributed Bragg reflector) structures are preferable.

The method for forming the semiconductor laser 10, which is suitable for the present invention, includes a method for forming a light emitting active layer on a GaAs substrate or forming the GaAs light emitting active layer on a Si substrate by means of an MBE process or an MOCVD process. In the case where the Si substrate is used, it is advantageous that the control circuits and the like for the optical pickup may readily be integrated on the same substrate by using an IC or LSI fabrication process. In this case, the waveguide is formed by depositing on the Si substrate, in order, a dielectric layer such as $SiO_2$ (n=1.446) and a waveguide layer (n=1.534) such a Corning 7059 glass.

The operation of the waveguide type pickup according to the embodiment is the same as that of the conventional example shown in FIG. 20 except that the returning light is prevented from returning back to the light source semiconductor laser by the metal layer 100, that is, by cutting or preventing the transmission of the TM polarized light.

Before explaining another embodiment shown in FIG. 9, a principle thereof will now be described with reference to FIGS. 6 to 8.

Figure 6:
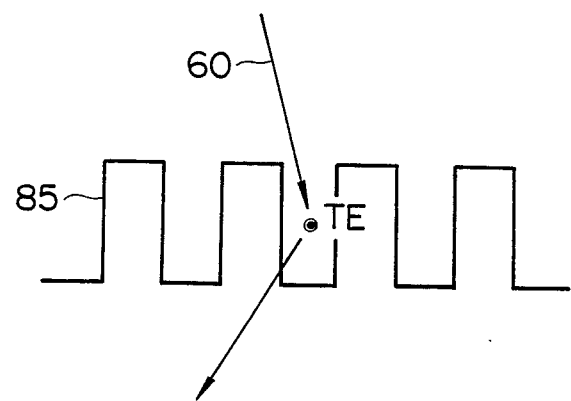
FIGS. 6 and 7 are schematic views for explaining a diffraction phenomenon in the case where the laser beam is introduced into the grating corresponding to the wavelength.
Figure 7:
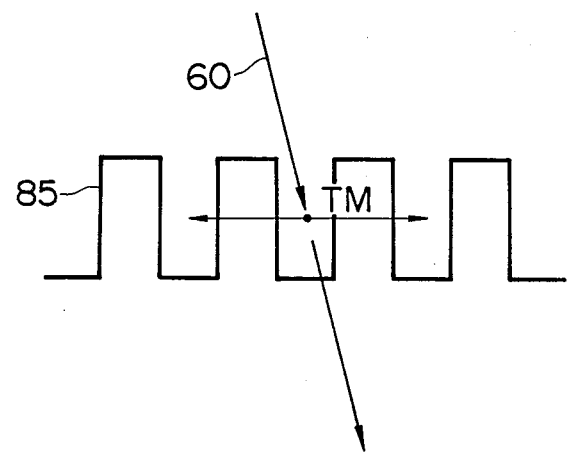

FIGS. 6 and 7 are schematic views for explaining a diffraction phenomenon in the case where a laser beam enters into a grating in the order of a wavelength thereof. In FIG. 6, reference numeral 60 denotes a laser beam, and numeral 85 denotes a grating. FIG. 6 shows a case where the laser beam 60 is introduced into the grating 85 in the state of TE polarization. The electric field of the laser beam 60 is oscillated in parallel to relief grooves of the grating 85. On the other hand, FIG. 7 shows a case where the laser beam 60 is introduced into the grating 85 in the state of TM polarization. The electric field is oscillated vertically relative to the relief groove of the grating 85. The length of the arrow corresponds to the wavelength of the laser beam 60. If a pitch or spatial period of the grating 85 becomes in the order of the wavelength, a difference in interactions of the grating 85 with the laser beam 60 between the TE polarization and the TM polarization is remarkable. As shown in FIG. 6, the TE-polarized light is diffracted, whereas, as shown in FIG. 7, the TM-polarized light is passed without diffraction.

Figure 8:
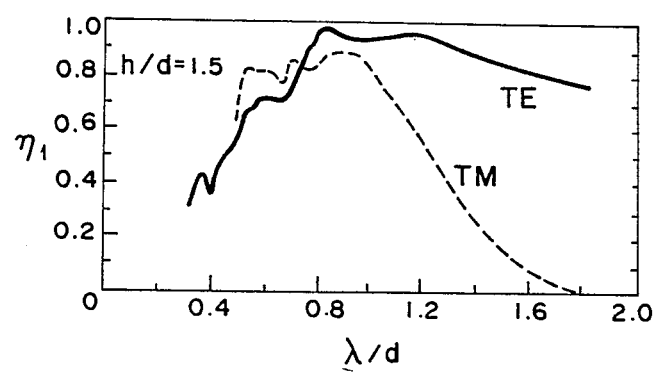
FIG. 8 is a graph showing the calculation results of the diffraction efficiency of the laser beam through the grating.

FIG. 8 shows calculated results of the diffraction efficiency of the laser beam through the grating disclosed in Applied Optics Vol. 23, No. 14 (1984), pp 2303 to 2310. In FIG. 8, $\eta_1$ is the efficiency of the first order diffraction, h is the height of the grooves of the grating, d is the pitch of the grooves thereof and $\lambda$ is the wavelength of the laser beam. If the pitch d of the grating is decreased relative to the wavelength $\lambda$ of the laser optical (toward the right along the abscissa axis), the TE polarized light is diffracted, and the TM polarized light is passed as shown. It is also known that the diffraction efficiency is at maximum when the incident angle is set at a Bragg angle. By utilizing this phenomenon, it is possible to form a polarized beam splitter composed of a grating type, i.e. surface relief type hologram.

Such a phenomenon may be understood in a macroscopic view due to the fact that the refractive index of the grating can be taken as being different between the TE polarized and the TM polarized lights. This is the case as in the optically anisotropic crystal. Thus, it is possible to form a ¼ wavelength plate made of the surface relief type hologram (refer to Japanese Patent Unexamined Publication No. 62-212940, for example).

Figure 9:
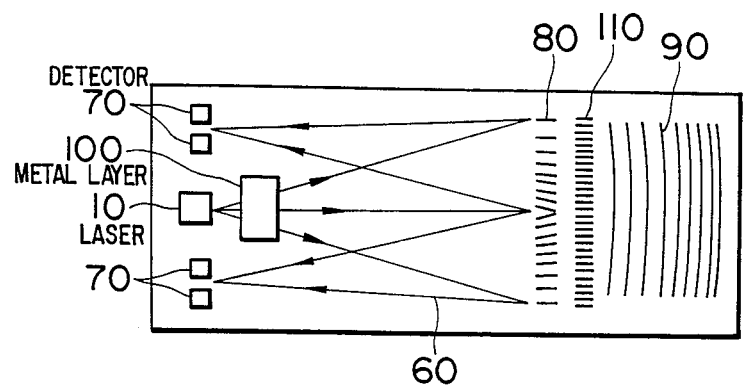
FIG. 9 is a schematic view showing an embodiment of the invention, in which a grating type ¼ wavelength plate is used.

FIG. 9 shows an embodiment of the invention in which the above-described surface relief type ¼ wavelength plate is used. In FIG. 9, there are shown a semiconductor laser 10, a laser beam 60, optical detectors 70, a beam splitter 80, a light convergent grating coupler 90, a metal layer 100, and a ¼ wavelength plate 110 composed of the surface relief type hologram.

The ¼ wavelength plate 110 is formed according to the above-described characteristics of the grating. The pitch of the grating of the ¼ wavelength plate 110 is smaller than a wavelength of the laser beam 60. The incident angle of the laser beam 60 falls within the incident angle range of 45 to 90 degrees. The length of the grooves of the grating is selected such that an optical path difference caused by a difference in refractive index between the TE polarized light and the TM polarized light is just a quarter of wavelength. Thus, it is possible to ensure the same effect as that of the ¼ wavelength plate of the anisotropic crystal to be obtained by the ¼ wavelength plate made of the surface relief type hologram.

With such an arrangement, the number of the optical parts may be reduced to make the optical pickup light in weight and to shorten the access time.

Figure 10:
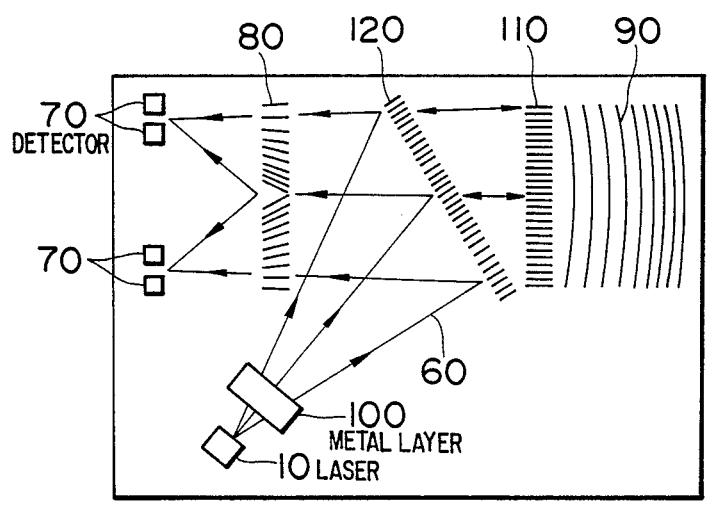
FIGS. 10 and 11 are schematic views showing different embodiments of the invention in which a grating type polarized beam splitter is used.

FIG. 10 shows an embodiment of the invention in which a polarized beam splitter is composed of a grating type, i.e., surface relief type hologram. In FIG. 10, there are shown a semiconductor laser 10, a laser beam 60, optical detectors 70, a beam splitter 80, a light convergent grating coupler 90, a metal layer 100, a ¼ wavelength plate 110 like that shown in FIG. 9, and a polarized beam splitter 120.

In this embodiment, the grating pitch of the polarized beam splitter 120 composed of the surface relief type hologram is smaller than a wavelength of the laser beam 60, thereby eliminating the diffractive light other than first order diffractive light. Also, the light of the TE polarization emmited from the semiconductor laser 10 is introduced at an incident angle set at the Bragg angle, thereby enhancing the diffraction efficiency.

The operation of the waveguide type optical pickup according to this embodiment will now be explained. The laser beam 60 emitted from the semiconductor laser 10 is the TE polarized light and is diffracted through the polarized beam splitter 120, without effect of the metal layer 100, to be introduced into the ¼ wavelength plate 110. The laser beam converted into a circularly polarized light by the ¼ wavelength plate 110 is led from the waveguide layer 40 into an external space by the light convergent grating coupler 90 and is converged or focused onto the disc. The reflective light from the disc is again introduced into the waveguide layer 40 by the light convergent grating coupler 90 to become a returning guided light advancing in the reverse direction opposite to the emission direction and is introduced into the ¼ wavelength plate 110. The returning light converted into the TM polarized light by the ¼ wavelength plate 110 is passed through the polarized beam splitter 120 and introduced into the beam splitters 80. The light is divided by each splitter 80 to converge onto the optical detectors 70.

According to this embodiment, since the beam splitters 80 may be arranged to be spaced apart from the optical path from the semiconductor laser 10 to the disc, it is possible to design the pickup so as to enhance the diffraction efficiency of the beam splitter 80 to enhance the light utilization efficiency. Also, since the emission light from the semiconductor laser 10 is introduced obliquely into the polarizing beam splitter 120 at the Bragg angle, the reflective light is not returned back to the semiconductor laser 10, thereby stabilizing the oscillation. If the semiconductor laser emits the TE polarized light, it is possible to dispense with the metal layer if a small reduction in stability is acceptable.

The function of the metal layer 100 according to the invention will be described. In the pickup according to the present invention, the optical elements, such as a ¼ wavelength plate 110 and a polarized beam splitter 120, whose operations are changed in accordance with the polarization condition of optical wave are used and the emission light from the light source is the TE polarized light in design. Accordingly, if the TM polarized light component is included in the light, this causes a noise. However, generally the semiconductor laser includes the TM polarized component. The TE mode pass filter using the metal layer 100 after the semiconductor laser 10 is located to remove the TM polarized component. Also, the polarized beam splitter 120 of the grating type cannot often have so large a extinction ratio as the bulk type as shown in FIG. 8. In this case, the metal layer serves to prevent the returning light from returning back to the light source.

In the embodiment of the invention, the emission light from the semiconductor laser 10 is explained to be the TE polarized light. The TM polarized light can be used without substantially changing the basic structure. In this case, however, the polarized beam splitter will allow the emission light from the semiconductor laser to pass therethrough and to diffract the reflective light from the disc. Therefore, it is necessary to change the arrangement of the optical system. In this case, if the reflective light is introduced into the polarized beam splitter at the Bragg angle, it is possible to enhance the diffraction efficiency. This will be explained in more detail with reference to FIG. 11.

Figure 11:
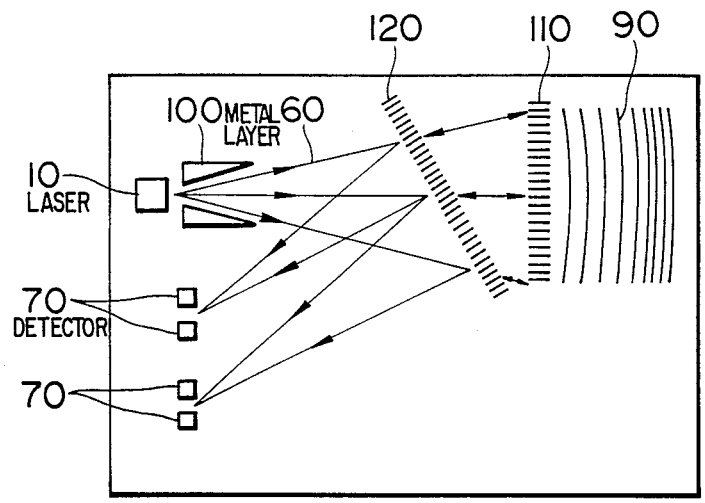

FIG. 11 shows an embodiment in which, the grating type polarized beam splitter is used, in the case where the emission light from the light source is the TM polarized light. In FIG. 11, there are shown a semiconductor laser 10, a laser beam 60, optical detectors 70, a light convergent grating coupler 90, metal layers 100, a ¼ wavelength plate 110, and a polarized beam splitter 120.

Because the light from the source is the TM polarized, the metal layers 100 form the TM mode pass filter. This will be later described in conjunction with FIGS. 11 and 12 in more detail. The laser beam 60 of the TM polarization emitted from the semiconductor laser 10 is passed through the polarized beam splitter 120 and is made a circularly polarized light by the ¼ wavelength plate 110 to be converged onto the optical disc by the light converging grating coupler 90. The reflective light from the optical disc is introduced into the waveguide layer 40 by the convergent grating coupler 90 and is made the TE polarized light by the ¼ wavelength plate 110. The light is introduced into the polarized beam splitter 120 at the Bragg angle and is divided into two part to be led into the optical detectors 70. In this arrangement, the polarized beam splitter 120 serves not only as the light beam splitting or separation for the TE polarized light and the TM polarized light but also to converge the reflective light from the optical disc to the optical detectors 70. For this reason, it is possible to dispense with one of the beam splitters in comparison with the embodiment shown in FIG. 10 (in case of the TE polarized light source). It is of course possible to use the beam splitters 80 as well.

Figure 12:
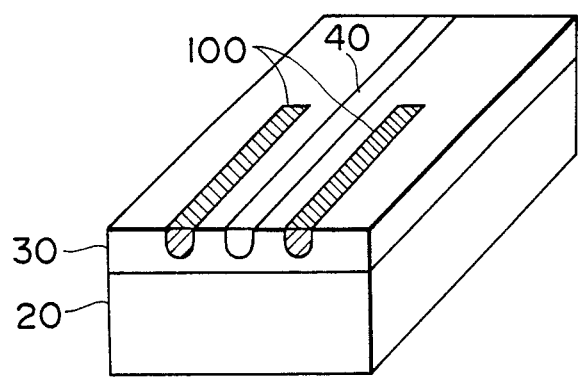
FIG. 12 is a perspective view showing an example of a TM mode pass filter.

FIG. 12 shows an example of a TE mode pass filter which can be applied as a part of the optical element of the invention. In FIG. 12, there are shown a substrate 20, a dielectric layer 30, a waveguide layer 40, and metal layers 100. When the light wave is TM-polarized, the electric field of the evanescent field is oscillated in a plane along the waveguide layer 40. Therefore, if the metal layers 100 are formed in the same plane as the waveguide layer 40 parallelly therewith as shown in FIG. 12, the TE polarized component of the light wave passing through the waveguide layer 40 is considerably attenuated for the same reason set forth in conjunction with FIG. 3. Thus, a TM mode pass filter may be realized. In the waveguide type TM mode pass filter, the dielectric layer 30 is formed on the substrate 20 by oxidation vapor deposition or vacuum evaporation, and the waveguide layer 40 and the metal layers 100 are formed by ion implantation, or thermal diffusion. In this case, it is possible to regard the metal layers 100 as directional couplers having large losses.

Also, in FIG. 12, the dielectric layer 30 is interposed between the waveguide layer 40 and the metal layers 100. It is possible to change the characteristics of the TM mode pass filter by changing the thickness of the dielectric layer 30 in the same manner as in FIG. 4.

Figure 13:
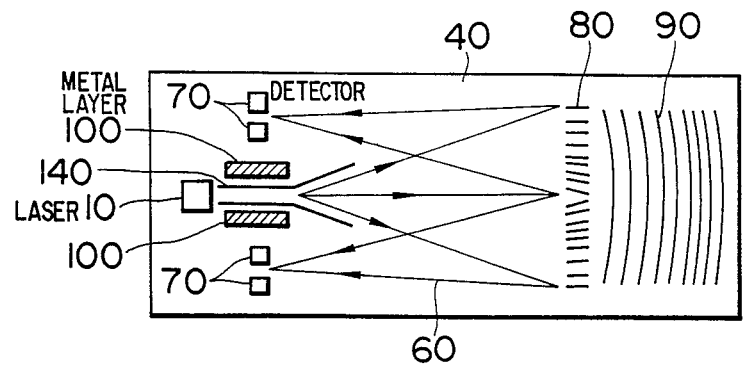
FIG. 13 is a schematic view showing a waveguide type pickup using a TM mode pass filter according to the invention.
Figure 14:
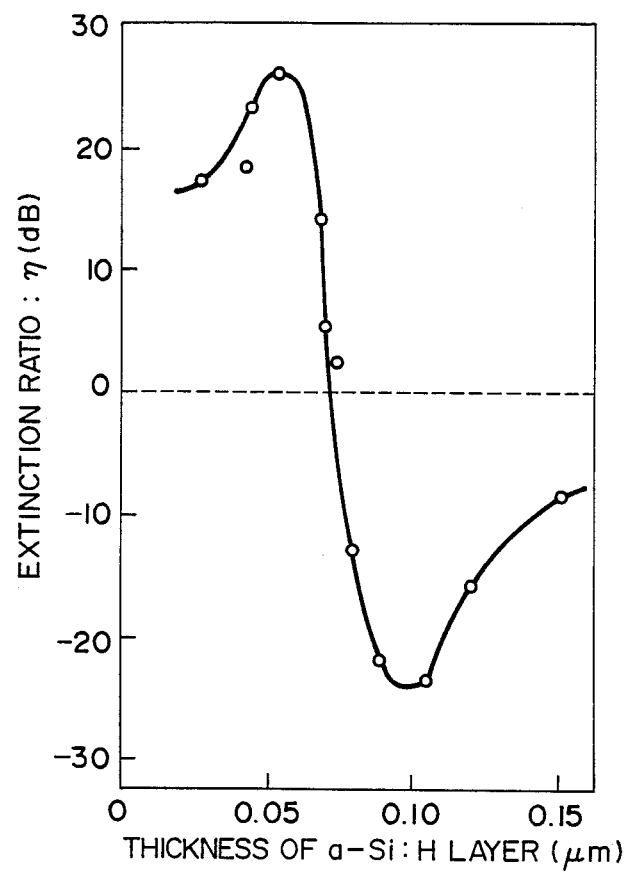
FIG. 14 is a graph showing the actually measured results in case of the waveguide type TM mode pass filter using a semiconductor layer.

FIG. 13 is a schematic structural view showing a waveguide type optical pickup using the TM mode pass filter according to the invention. In FIG. 13, there are shown a semiconductor laser 10, a laser beam 60, optical detectors 70, a beam splitter 80, a light converging grating coupler 90, metal layers 100 and a three-dimensional waveguide 140 shown in FIG. 12.

The emission light from the semiconductor laser 10 is TM-polarized. The metal layers 100 and the three-dimensional waveguide 140 form the above-described TM mode pass filter. The light wave passing through the TM mode pass filter is led into the two-dimensional waveguide layer 40. The waveguide is produced by forming the three-dimensional waveguide 140 having a high refractive index in the waveguide layer 40, deposited on the substrate, by ion implantation or thermal diffusion.

Since the waveguide type optical pickup of this embodiment is the same as that shown in FIG. 1 except for the polarized state of the light from the light source, the explanation of the operation thereof is omitted. Also, although the ¼ wavelength plate is not used in this embodiment, it is possible to arrange the bulk type one outside the waveguide as in the embodiment shown in FIG. 1 or to form a grating type one within the waveguide as in the embodiment shown in FIG. 9.

The waveguide type TM mode pass filter is classified into the above-described type using the metal layers and the other type having the semiconductor layer. FIG. 12 is cited from Transaction of IEICE,E70,4 (1987) pp 35-36. The waveguide obtained by forming an a-Si:H layer in/on a surface of the waveguide layer is operated as the TM mode pass filter when the a-Si:H layer is thin and the waveguide is operated as the TE mode pass filter when the layer is thick. When the thickness is 0.05um, the extinction ratio is more than 25dB for the TM mode pass filter.

Figure 15:
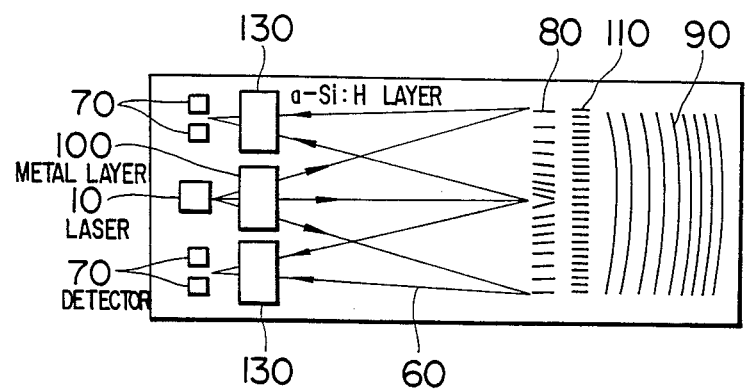
FIG. 15 is a schematic view showing a waveguide type optical pickup using a waveguide type TM mode pass filter using a semiconductor layer.

FIG. 15 is a schematic view showing a waveguide type optical pickup using the TM mode pass filter including the above-described semiconductor layer. In FIG. 15, there are shown a semiconductor laser 10, a laser beam 60, optical detectors 70, a beam splitter 80, a light convergent grating coupler 90, metal layer 100, a ¼ wavelength plate 110 an a-Si:H layer 130.

In this embodiment, the a-Si:H layer 130 is added to the waveguide type optical pickup shown in FIG. 9. It is preferable that the optical detectors 70 be subjected only to the reflective light from the disc, which has further been converted into the TM polarized light. However, the emission light from the semiconductor laser 10 is TE-polarized, and the reflective light by the components such as beam splitter 80, light convergent grating coupler 90 and ¼ wavelength plate 110 may become a noise to be introduced into the optical detectors 70. As a result, the S/N ratio of the reproduced signal may be degraded. In this case, the TM mode pass filter composed of the a-Si:H layer 130 is located before the optical detectors 70, thereby removing the unnecessary TE polarized component.

In this embodiment, the TM mode pass filter using the a-Si:H layer is provided for removing the noise to the optical detectors 70. This filter may be replaced by the TM mode pass filter using the metal layers. In the same manner, it is possible to use the metal layers for preventing the returning light from returning back to the light source. Also, the a-Si:H layer is exemplified but other semiconductor films may of course be used instead of the a-Si:H layer.

Figure 16:
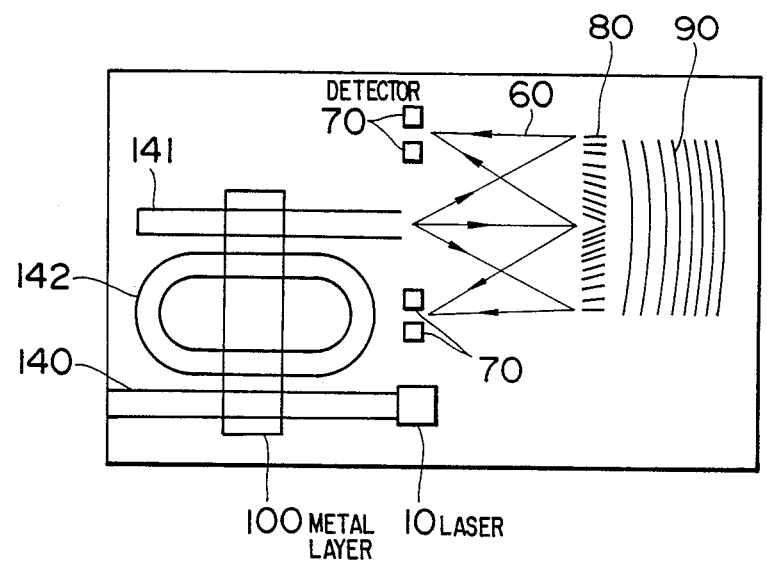
FIG. 16 is a schematic view showing a waveguide type pickup according to the invention, using a waveguide type wavelength selective means.

FIG. 16 is a schematic view showing the waveguide type optical pickup according to the invention, in which a waveguide type wavelength selective means is used. In FIG. 16, there are shown a semiconductor laser 10, a laser beam 60, optical detectors 70, a beam splitter 80, a light convergent grating coupler 90, a metal layer 100, three-dimensional waveguide 140 and 141, and an annular three-dimensional waveguide 142.

The beam splitter 80, the light convergent grating coupler 90 and the like are optical elements of the diffraction type and do not meet the phase matching condition when the wavelength of the light source is changed, resulting in displacement of the convergent spot or generation of aberration, while generally the semiconductor laser changes its oscillation wavelength according to a temperature or an output power. In FIG. 16, the emission light from the semi-conductor laser 10 propagates through the first three-dimensional waveguide path 140 and only the beam having a resonant wavelength is picked up by the annular three-dimensional waveguide path 142 to be transmitted to the second three-dimensional waveguide path 141. At this time, since the metal layer 100 is laid over the three waveguides, the selection is simultaneously performed for the wavelength and the TE polarization. With such an arrangement, it is possible to offer designed performance from the diffraction type optical elements such as beam splitter 80, light convergent grating coupler 90 and the like and simultaneously to prevent the returning light from returning back to the semiconductor laser 10.

Figure 17:
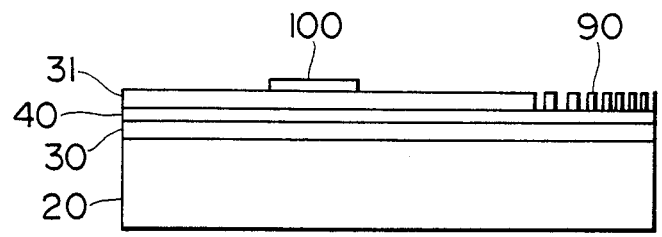
FIG. 17 is a side elevational view showing a structure of a suitable waveguide for the waveguide type optical pickup of the invention and a method for producing the same.

FIG. 17 shows a structure of a preferred waveguide for the waveguide type optical pickup according to the present invention and a manufacturing method therefor. In FIG. 17, there are shown a substrate 20, a dielectric layer 30, a buffer layer (intermediate layer) 31, a waveguide layer 40, a convergent grating coupler 90, and a metal layer 100.

FIG. 17 shows the case where the buffer layer 31 between the waveguide layer 40 and the dielectric layer for the metal layer 100 serves for forming the convergent grating coupler 90 as well. For this arrangement, the dielectric layer 30, the waveguide layer 40 and the buffer layer 31 are superposed in this order on the substrate. Thereafter the metal layer 100 is deposited thereon and grooves are formed in the buffer layer 31 to provide the convergent grating coupler 90. Thus, the manufacturing process may be simplified. In this embodiment, the convergent grating coupler 90 is formed in the buffer layer 31 but the diffraction type optical elements such as a beam splitter and a ¼ wavelength plate may be formed therefrom.

Figure 18:
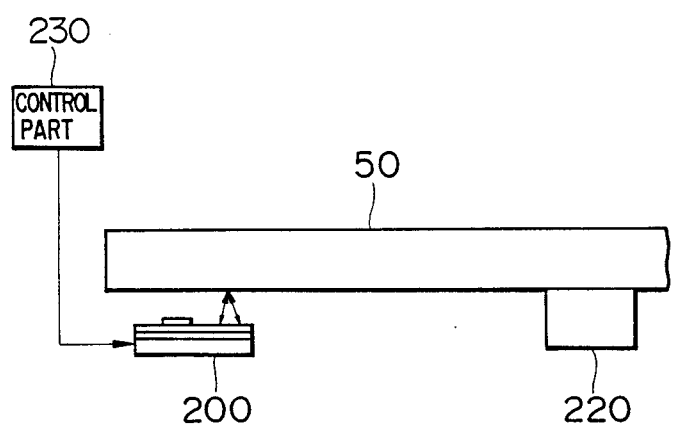
FIG. 18 is a schematic view showing an optical disc apparatus provided with an optical pickup according to the invention.

FIG. 18 is a schematic view showing an optical disc apparatus provided with the waveguide type optical pickup according to the present invention.

The optical disc drive or apparatus can record and reproduce informations at a high density by using the laser beam converged in a submicron order, and may record a large volume of image informations and acoustic informations, which is inevitable for the recent information society. For instance, the optical disc apparatus are classified into three types, i.e., (1) only for reproduction type, (2) additionally writable type and (3) rewritable type as is known for example in "Nikkei Electronics" (March 26, 1984). The "reproduction only" type and the "additionally writing" type are developed to a substantially practical stage. On the other hand, a method has not yet been established for the rewritable type. Research and developments have been made for the rewritable type optical discs using magneto-optical material or phase change material.

In FIG. 18, there are shown an optical disc 50, a waveguide type pickup 200, a motor 220, and a control part 230. The optical disc 50 is rotated by the motor 220. The waveguide type optical pickup 200 is adapted to converge the laser beam onto the optical disc 50 to record, reproduce and/or erase the informations. The control part 230 controls the operation of the waveguide type optical pickup 200 and the processing of the input/output signals. Thus, it is possible to realize the optical disc apparatus in which the adverse effect of the returning light can be avoided and the access time is shortened.

Figure 19:
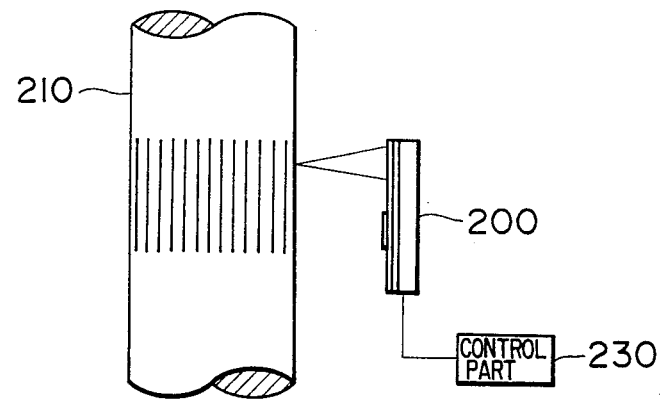
FIG. 19 is a schematic view showing a rotary encoder system provided with a waveguide type optical pickup according to the invention.

FIG. 19 is a schematic view showing a rotary encoder system provided with the waveguide type optical pickup according to the invention. In FIG. 19, there are shown a waveguide type pickup 200 and a rotor 210. Two kinds of lines different in refractive index are depicted on the rotor 210 as shown in FIG. 19. The pattern is reproduced by the waveguide type pickup 200. It is possible to detect the rotation speed of the rotor 210 by the count per unit time. Thus, it is possible to realize a rotary encoder that is small in size and light in weight.

Figure 21:
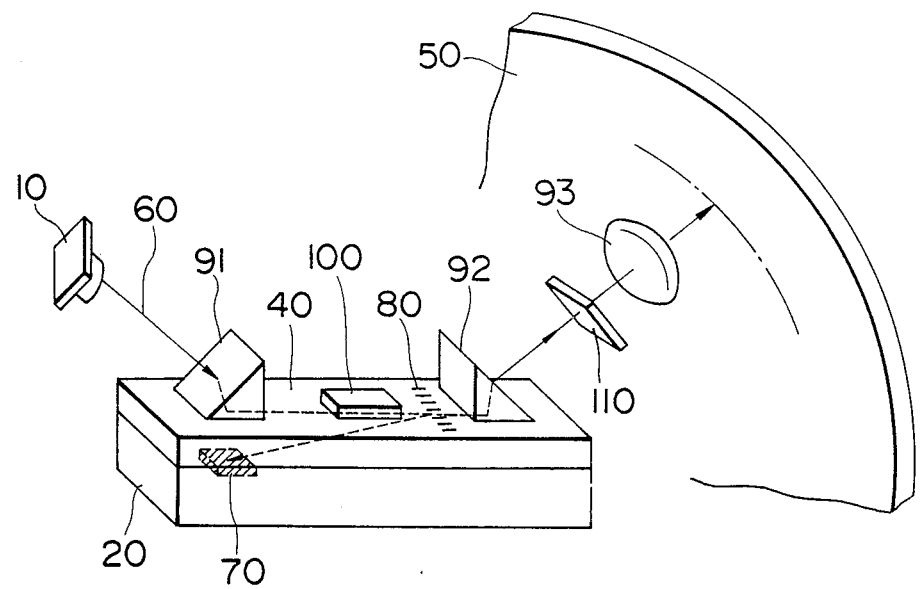
FIG. 21 is a schematic view showing an embodiment of the invention in which coupling prisms are used.

FIG. 21 shows an embodiment in which coupling prisms are arranged for the input/output of the light into/out of the waveguide. In FIG. 21, there are shown a semiconductor laser 10, a substrate 20, an optical waveguide 40, an optical disc 50, a laser beam 60, an optical detector 70, a beam splitter 80, coupling prisms 91 and 92, an objective lens 93, a TE mode pass filter 100 made of metal layer, and a ¼ wavelength plate 110. The laser beam 60 in the state of the TE polarization emitted from the semiconductor laser 10 is introduced into the waveguide layer 40 by the coupling prism 92, passed through the beam splitter 80, deflected from the waveguide layer 40 by the coupling prism 92, passed through the ¼ wavelength plate 110 to become the circularly polarized light focussed on the optical disc 50 by the objective lens 93.

The reflective light from the optical disc 50 is passed through the objective lens 93, converted into the TM polarized light through the ¼ wavelength plate 110, and is again introduced into the waveguide layer 40 by the coupling prism 93. The light is diffracted by the beam splitter 80 and is introduced into the optical detector 70.

In this embodiment, the degree of integration is low but is is easy to manufacture the system since the light source and the converging grating coupler are not included in the waveguide layer. Incidentally, in FIG. 21, only one optical detector is shown but two optical detectors may be provided in the same manner as in FIG. 1.

Figure 22:
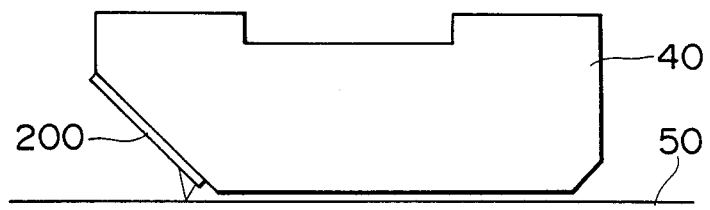
FIG. 22 is a schematic view of a system in which the optical pickup of the invention is loaded on an air slider.

FIG. 22 is a structural schematic view showing a system in which a waveguide type optical head is mounted on an air slider. In FIG. 22, there are shown a waveguide type optical head 200, an air slider 40 and an optical disc 50. The optical head, i.e., the optical pickup according to the invention is mounted on the air slider 40, so which make it that possible to attain a high speed access unlike the conventional optical head.

We claim:
1. An optical element comprising:
   an optical waveguide for propagating an emission light from a light source;
   an optical path changing means for leading the emission light from the optical waveguide to an external space, converging the thus led emission light onto an information recording medium, and introducing a reflective light reflected from the information recording medium into the optical waveguide;
   a beam splitter means for branching the reflective light, introduced by said optical path changing means, away from the optical path of the emission light and for directing the branched light into light detecting means;

a filter means for allowing one of TE-polarized light and TM-polarized light to pass therethrough, said filter means being located in an optical path from said light source to said optical path changing means; and a polarization switching means for changing a polarized state of light by allowing the light to reciprocatingly pass therethrough, said switching means being situated in an optical path between said optical path changing means and said information concerning medium;

wherein at least one of said filter means and said polarization switching means is disposed for preventing reflective light from the information recording medium from being received by said light source so as to enable improvement of a S/N ratio of a reproduced signal.

2. The optical element according to claim 1, wherein said filter means includes an electrically conductive material disposed in parallel with the optical waveguide.

3. The optical element according to claim 1, wherein said polarization switching means includes a ¼ wavelength plate made of a member selected from a group consisting of an anisotropic crystal and a surface relief type hologram.

4. The optical element according to claim 1, wherein said optical path changing means includes a light focusing grating coupler.

5. The optical element according to claim 2, wherein said emission light is the TE-polarized, and said electrically conductive material comprises a metal layer parallel with the waveguide.

6. The optical element according to claim 2, wherein said emission light is the TM-polarized, and the electrically conductive material comprises metal layers disposed on both sides of the optical path within said waveguide layer.

7. The optical element according to claim 1 wherein an intermediate layer of a dielectric member having a smaller refractive index than that of said optical waveguide is interposed between said filter means and said optical waveguide.

8. An optical disc apparatus comprising:
the optical element of claim 1;
an optical disc including the information recording medium;
rotation means for rotating the optical disc; and
control means for controlling the optical element to enable recording, erasing and reproducing of information onto and from the optical disc.

9. A rotary encoder comprising:
the optical element of claim 1; and
a rotor having lines depicted thereon;
wherein the optical element enables reading of the lines on the rotor under light projected therefrom so as to enable measurement of a rotation speed of the rotor.

10. The optical element according to claim 1, wherein said polarization switching means changes a polarized state of the reflective light passing therethrough in one direction to another polarized state different from a polarized state of the emission light passing therethrough in an opposite direction, said filter means enabling the polarized state of the emission light to pass therethrough and preventing the another polarized state of the reflective light from passing therethrough, thereby preventing the reflection light from being received by the light source.

11. The optical element according to claim 10, wherein the emission light of the light source is TE-polarized light, and said polarization switching means changes the polarized state of the reflective light to the another polarized state of TM-polarized light.

12. The optical element according to claim 10, wherein said beam splitter means includes a polarized beam splitter composed of a surface relief type hologram located in an optical path extending between said light source and said optical path changing means, said filter means passing one of TE-polarized and TM-polarized light therethrough in a direction at a Bragg angle of the surface relief type hologram relative to said polarized beam splitter, said filter means being located in an optical path extending between said light source and said polarized beam splitter.

13. The optical element according to claim 10, wherein said beam splitter means includes a polarized beam splitter composed of a surface relief type hologram located in an optical path extending between said light source and said optical path changing means so as to receive reflective light incident thereon at a Bragg angle, said filter means enabling TE-polarized light to pass therethrough.

14. The optical element according to claim 10, further comprising a semiconductor layer, located in an optical path between said optical path changing means and said light detecting means, for enabling light of the another polarized state of the reflective light to pass therethrough.

15. The optical element according to claim 10, wherein said optical path changing means includes a light-focusing grading coupler, said polarization switching means includes a ¼ wavelength plate located in an optical path between said beam splitter means and the information recording medium, an intermediate layer being disposed between said optical waveguide and said filter means, and at least one of said grading coupler, said beam splitter means and said ¼ wavelength plate being located on a plane of said intermediate layer.

16. An optical element comprising:
an optical waveguide for propagating an emission light from a light source;

an optical path changing means for leading the emission light from the optical waveguide to an external space, converging the thus led emission light onto an information recording medium, and introducing a reflective light reflected from the information recording medium into the optical waveguide;

a beam splitter means for branching the reflective light, introduced by said optical path changing means, away from the optical path of the emission light and for directing the branched light into light detecting means;

a filter means for allowing one of TE-polarized light and TM-polarized light to pass therethrough, said filter means being located in an optical path from said light source to said optical path changing means; and a polarization switching means for changing a polarized state of light by allowing the light to reciprocatingly pass therethrough, said switching means being situated in an optical path between said optical path changing means and said information concerning medium;

wherein said beam splitter means includes a polarized beam splitter composed of a surface relief type hologram, said beam splitter being provided in an optical path from the light source to said optical path changing means, and said filter means comprises a TE mode pass filter for cutting the TM polarized light provided between said polarized beam splitter and said optical path at a Bragg angle of the surface relief type hologram relative to said polarized beam splitter.

17. The optical element according to claim 16, wherein said light source is adapted to deliver TE-polarized light instead of said filter means.

18. An optical element comprising:

an optical waveguide for propagating an emission light from a light source;

an optical path changing means for leading the emission light from the optical waveguide to an external space, converging the thus led emission light onto an information recording medium, and introducing a reflective light reflected from the information recording medium into the optical waveguide;

a beam splitter means for branching the reflective light, introduced by said optical path changing means, away from the optical path of the emission light and for directing the branched light into light detecting means;

a filter means for allowing one of TE-polarized light and TM-polarized light to pass therethrough, said filter means being located in an optical path from said light source to said optical path changing means; and a polarization switching means for changing a polarized state of light by allowing the light to reciprocatingly pass therethrough, said switching means being situated in an optical path between said optical path changing means and said information concerning medium;

wherein said beam splitter means includes a polarized beam splitter made of a surface relief type hologram, said beam splitter being located in an optical path between said light source and said optical path changing means, said filter means includes a TM mode pass filter for cutting the TE-polarized light, and said polarized beam splitter is oriented so that the reflective and TE-polarized light having passed through said polarization switching means is introduced at the Bragg angle of the surface relief type hologram.

19. An optical element comprising:

an optical waveguide for propagating an emission light from a light source;

an optical path changing means for leading the emission light from the optical waveguide to an external space, converging the thus led emission light onto an information recording medium, and introducing a reflective light reflected from the information recording medium into the optical waveguide;

a beam splitter means for branching the reflective light, introduced by said optical path changing means, away from the optical path of the emission light and for directing the branched light into light detecting means;

a filter means for allowing one of TE-polarized light and TM-polarized light to pass therethrough, said filter means being located in an optical path from said light source to said optical path changing means;

a polarization switching means for changing a polarized state of light by allowing the light to reciprocatingly pass therethrough, said switching means being situated in an optical path between said optical path changing means and said information concerning medium;

a semiconductor layer provided in an optical path from said information recording medium toward said optical detecting means and for selectively allowing one of the Te-polarized light and the TM-polarized light to pass therethrough.

20. An optical element comprising:

an optical waveguide for propagating an emission light from a light source;

an optical path changing means for leading the emission light from the optical waveguide to an external space, converging the thus led emission light onto an information recording medium, and introducing a reflective light reflected from the information recording medium into the optical waveguide;

a beam splitter means for branching the reflective light, introduced by said optical path changing means, away from the optical path of the emission light and for directing the branched light into light detecting means;

a filter means for allowing one of TE-polarized light and TM-polarized light to pass therethrough, said filter means being located in an optical path from said light source to said optical path changing means;

a polarization switching means for changing a polarized state of light by allowing the light to reciprocatingly pass therethrough, said switching means being situated in an optical path between said optical path changing means and said information concerning medium; and an intermediate layer of a dielectric member having a smaller refractive index than that of said optical waveguide is interposed between said filter means and said optical waveguide;

wherein at least one of a light focusing grating coupler, said beam splitter means, and a $\frac{1}{4}$ wavelength plate is formed in the same surface as that of said intermediate layer between a conductive layer forming at least part of said filter means and said optical waveguide.

21. An optical element comprising:

an optical waveguide for propagating an emission light from a light source;

an optical path changing means for leading the emission light from the optical waveguide to an external space, converging the thus led emission light into an information recording medium, and introducing a reflective light reflected from the information recording medium into the optical waveguide;

a beam splitter means for branching the reflective light, introduced by said optical path changing means, away from the optical path of the emission light and for directing the branched light into light detecting means;

a filter means for allowing one of TE-polarized light and TM-polarized light to pass therethrough, said filter means being located in an optical path from said light source to said optical path changing means; and a polarization switching means for changing a polarized state of light by allowing the light to reciprocatingly pass therethrough, said switching means being situated in an optical path between said optical path changing means and said information concerning medium;

wherein the optical waveguide includes a wavelength selective means including a first optical waveguide for introducing light wave from the optical source, a second optical waveguide independent of said first optical waveguide and a third optical waveguide in the form of an annulus situated between said first and second optical waveguides is provided in the optical waveguide, and the filter means includes conductive material in the form of a layer laid over on surfaces of said first, second and third optical waveguide paths.

22. An optical element comprising:

an optical waveguide for propagating an emission light from a light source;

an optical path changing means for leading the emission light from the optical waveguide to an external space, converging the thus led emission light onto an information recording medium, and introducing a reflective light reflected from the information recording medium into the optical waveguide;

a beam splitter means for branching the reflective light, introduced by said optical path changing means, away from the optical path of the emission light and for directing the branched light into light detecting means;

a filter means for allowing one of TE-polarized light and TM-polarized light to pass therethrough, said filter means being located in an optical path from said light source to said optical path changing means;

a polarization switching means for changing a polarized state of light by allowing the light to reciprocatingly pass therethrough, said switching means being situated in an optical path between said optical path changing means and said information concerning medium; and an intermediate layer of a dielectric member having a smaller refractive index than that of said optical waveguide is interposed between said filter means and said optical waveguide;

said intermediate layer having a variable refractive index.

* * * * *